United States Patent
Schock et al.

(10) Patent No.: US 6,525,122 B1
(45) Date of Patent: Feb. 25, 2003

(54) PLASTICS MOLDINGS

(75) Inventors: Friedrich Schock, Schorndorf (DE); Karl Schock, Schorndorf (DE); Gunter Hieber, Schorndorf (DE); Daniel Knospe, Schorndorf (DE); Horst Schlier, Schorndorf (DE)

(73) Assignee: Schock & Co. GmbH, Schorndorf (DE)

( * ) Notice: Subject to any disclaimer, the term of this patent is extended or adjusted under 35 U.S.C. 154(b) by 0 days.

(21) Appl. No.: 09/271,998

(22) Filed: Mar. 18, 1999

Related U.S. Application Data

(63) Continuation of application No. PCT/EP97/04835, filed on Sep. 6, 1997.

(30) Foreign Application Priority Data

Sep. 23, 1996 (DE) .......................................... 196 39 039

(51) Int. Cl.$^7$ ................................................. C08K 5/09
(52) U.S. Cl. ........................ 524/322; 264/300; 264/319; 264/331.18; 524/430; 524/437; 524/493; 524/497
(58) Field of Search ................................. 524/493, 494, 524/430, 322, 437; 264/300, 319, 331.18

(56) References Cited

U.S. PATENT DOCUMENTS

| | | | | |
|---|---|---|---|---|
| 4,221,697 A | * | 9/1980 | Osborn et al. ............... | 525/298 |
| 5,242,968 A | * | 9/1993 | Minghetti et al. ........... | 524/430 |
| 5,753,741 A | * | 5/1998 | Harke et al. ................ | 524/494 |
| 5,800,910 A | * | 9/1998 | Harke et al. ................ | 428/212 |
| 5,847,036 A | * | 12/1998 | Takabatake et al. ........ | 524/321 |
| 5,965,635 A | * | 10/1999 | Rancich et al. ............. | 523/176 |

FOREIGN PATENT DOCUMENTS

| | | |
|---|---|---|
| DE | 43 04 494 A1 | 8/1994 |
| EP | 0 786 479 A2 | 7/1997 |
| JP | 07 188 505 A | 7/1995 |
| JP | 09 002 857 A | 1/1997 |
| WO | WO 92/03497 | 3/1992 |

OTHER PUBLICATIONS

English translation of WO/94 18270, Curable Casting Compositions, corresponding to DE 43 04 494 A1.
Chemical Abstract CAS 1997, 126–202913f, Compositions for Manufacture of Artificial Granite Having Grain Patterns, corresponding to Japanese patent application 09,002,857.
Chemical Abstract CAS 1995, 123–342787f, Acrylic Polymer Premixes and Manufacture of Artificial Marbles With Good Weather Resistance, corresponding to Japanese patent No. 07,188,505.
Acrylic Resin Premix and Production of Artificial Marble, Japanese patent No. 07,188,505 published on Jul. 25, 1995.

* cited by examiner

Primary Examiner—Judy M. Reddick

(57) ABSTRACT

In order to achieve, in the case of a plastics moulding, in particular a moulded part such as e.g. a kitchen sink, a washbasin or a work-top or similar, comprising a polymer phase formed from a curable reaction mass and,: embedded therein, a particulate filling material which contains a resin material filled with an inorganic filler, in addition to a good resistance to water whitening a high resistance to crack formation in the hot-cold cycle, it is proposed that the polymer phase contains up to 5 wt %, referred to the plastics moulding, of inorganic additive particles, that the particulate filling material is swellable in the curable reaction mass, that the filled resin material comprises a content of inorganic filler in the range from 50 to 80 wt % with an average particle size of approx. 5 to approx. 100 $\mu$m, and that the filling material has a particle size in the range from 60 to 8000 $\mu$m and is contained in the plastics moulding in a proportion of approx. 30 to approx. 75 wt %.

29 Claims, 1 Drawing Sheet

PLASTICS MOLDINGS

This is a continuation of international PCT application No. PCT/EP97/04835 having international filing date of Sep. 6, 1997, which designates the United States.

BACKGROUND OF THE INVENTION

The invention relates to a plastics moulding, in particular a moulded part such as a kitchen sink, a washbasin, or a work-top or similar, comprising a polymer phase formed from a curable reaction mass and a particulate filling material embedded therein, which contains a resin material filled with an inorganic filler. The invention relates in particular to mouldings with a so-called granite design.

Moulded parts and slabs with granite designs or else with plain-coloured surface are manufactured traditionally by conventional casting methods. For this all the components of a casting compound including the fillers are mixed, degassed and cast/pumped into moulds and polymerised. In the case of slabs the continuous belt casting method is also applied on a large scale. Casting compounds with a viscosity in the range from 2000 to 40000 mPas are pourable/pumpable.

In the case of acrylic (or polyester) composites with aluminium oxide trihydrate (ATH) as filler the granite effect can be obtained by curable resin-containing structures such as slabs, bars etc., being fine ground to a granule and the granule being used in turn as a decorative filling material in the polymer phase. The granule is used according to the desired design in a particle size range selected for this. Fine granite designs can be obtained with particle sizes of 50–900 μm, medium-coarse ones with 900–2500 μm and coarse ones with >2500 μm.

Since dark colour tones are frequently produced with granite designs, the reduction of the so-called water whitening is a central problem particularly with moulded parts. Due to the permanent influence of hot and cold water over long periods, a visibly unattractive brightening, the water whitening, comes about. It is already known that the water whitening can be reduced considerably by the use of fillers (for example ATH) which are coated with silanes. As a consequence, however, the mechanical and thermal properties of the moulded part material change, so that in the hot-cold cycle (cycle: 3 min hot water with 87° C.; 3 min cold water with 21° C.) the moulded parts already acquire small hair-line cracks after a few hundred cycles or even rupture completely, so that they have to be replaced.

A typical casting compound formulation consists in its main components of 40 to 55 wt % (silanized) ATH, 5 to 20 wt % granule and 30 to 40 wt % casting resin. If on the other hand unsilanized ATH is used, the crack behaviour in the hot-air cycle can certainly be rated as more positive, but on the other hand a serious brightening (water whitening) is observed on the areas of the moulded part washed by water.

SUMMARY OF THE INVENTION

The object of the invention is to propose a plastics moulding which in addition to the good resistance to water whitening possesses a high resistance to crack formation in hot-cold cycles.

This object is achieved according to the invention in the case of a plastics moulding of the kind described in the preamble by the fact that the polymer phase comprises up to 5 wt %, referred to the weight of the plastics moulding, of inorganic additive particles that the particulate filling material is swellable in the curable reaction mass, that the filled resin material comprises a content of inorganic filler in the range from 50 to 80 wt % with an average particle size of approx. 5 to approx. 100 μm, and that the filling material has a particle size in the range from 60 to 8000 μm and is contained in the plastics moulding in a proportion of approx. 30 to approx. 75 wt %.

Due to the limitation of the inorganic additives in the polymer phase to not more than 5 wt % of the total weight of the moulding, the polymer phase remains substantially filler-free. The selection of the filling material according to its swellability in the reaction mass requires the abandonment of the manufacturing methods conventional to date in which the reaction mass has been pumped/poured into moulds together with the added filling material. The viscosity of the mixture of reaction mass and swollen filling material and optionally the inorganic additives attains a level such that the mixture is no longer pumpable or pourable.

Surprisingly it has been found, however, that precisely because of the swelling of the filling materials in the reaction mass a mixtures is obtainable [with which, when] it is charged into a mould half, on the closure of the mould and acting upon with a predetermined pressure, a void-free filling of the mould cavity is achievable without a destruction of the particulate structure of the filling material taking place, and the latter can exert unimpeded its decorative and/or contrasting effect on the exposed side, if this is desirable as with a granite design. A further aspect of the invention is to be seen in a plastics moulding of the kind described in the preamble in which a particulate filling material is used which is swellable in the reaction mass in such a way that a test formulation of 60 wt % of curable reaction mass and 40 wt % of the particulate filler exhibits a swelling factor $\geq 2$.

There also forms part of the invention a process with which the plastics mouldings described above can be produced.

Such a process comprises the steps:

Production of a mixture of a curable reaction mass for the formation of a polymer phase with a particulate filling material and transfer of the mixture for curing into a mould, wherein the curable reaction mass is used substantially free from inorganic fillers, wherein there is used as filling material a filling material swellable in the reaction mass and containing a resin material filled with an inorganic filler, wherein the content of the inorganic fillers in the filling material comes to 50 to 80 wt % and wherein the particles of the inorganic filler exhibit an average particle size of approx. 5 to 100 μm and the filling material; exhibits a particle size of approx. 60 to approx. 8000 μm and is so metered that it is contained in the plastics moulding in a content of approx. 30 to approx. 75 wt %, wherein the filling material is allowed to swell in the curable reaction mass until such time as the mixture is no longer pourable, wherein the mixture is placed for curing in one of the mould halves disposed in a press, the mould is closed and a predetermined compressive force is applied to the mould and the mixture is cured thermally in the closed mould.

The method of procedure according to the invention differs from the prior art both in the formulation and the technology.

In comparison with the conventional method of procedure the use of loose ATH in the polymer phase is abandoned substantially completely and instead of this a filling material is used which contains a resin material in the form of a polymer granule with a specified swelling behaviour and an adjusted content of an inorganic filler. There are considered as resin component all radically polymerisable casting resins, preferably however acrylic resins and polyester resins. There are suitable as fillers all mineral granular and fibrous materials, but also all synthetic granules, preferably however ATH. The filler content of the finished plastics moulding is markedly lower compared with the conventional technology at preferably approx. 40 to 50 wt %.

Due to the swelling of the filling material/polymer granules in the reaction mass for forming the polymer phase, mixtures which are no longer pumpable and which can be processed only with a special technology are obtained. The mixture consisting of reaction mass and filling material and optionally further additives is charged into the one half of the open mould and is by closing of the mould brought into the desired three-dimensional form in the mould press under corresponding pressure according to the displacement method.

Critical for the operation of the whole process according to the invention is a quite particular swelling behaviour of the filling material/polymer granules together with a particular final viscosity of the mixture.

The swelling behaviour of the polymer granules is dependent on the nature of the filler used, the filler content, the nature of the resin material used and the degree of crosslinking in the resin. There can be taken as a guide value in selecting a suitable filling material/polymer granule a swell factor with a value $\geq 2$, which can be determined for a test formulation of 60 wt % reaction mass and 40 wt % filling material by the test method described in greater detail below.

If the swell factor is not maintained for the filling material used, a lack of flowability of the mixture frequently ensues and hence an unsatisfactory result in the moulding step.

Due to the high viscosity of the mixture of reaction mass and swollen filling material the problem of sedimentation, in particular of coarse granule particles, is completely eliminated. This means that an undesirable unequal distribution of the various components of the mixture in the finished plastics moulding is prevented. Accordingly there are no warpage problems in the case of slabs and there are smaller internal tensions in the case of moulded parts.

In the case of moulded parts the abandonment of loose ATH in the polymer phase and instead of this the substantially exclusive use of polymer granule as filling material improves the performance of the moulded parts considerably:

Whereas according to the prior art it was possible to obtain a satisfactory resistance to water whitening only at the expense of a much reduced hot-cold resistance, a good performance can now be obtained for both properties.

The reduced filler content of the plastics moulding results additionally in an improved abrasion, scratch and stain resistance. Due to the high viscosity in the mixture, there are no sedimentation problems of any kind. Even granite structures with particle sizes of 5 mm and more are realizable without further measures and without detracting from product quality.

Dispensing with loose ATH in the polymer phase leads in addition to a clear, attractive design image.

With slabs the dispensing with loose ATH in the polymer phase produces in addition to an improvement in the stain resistance improved crack strength under thermal loading.

Because of the high viscosity there are no sedimentation problems involving coarse granule particles, and hence no warpage problems of any kind.

The dispensing with loose ATH leads to designs with a clear, attractive image.

The additives already discussed above which are possible in the polymer phase in small proportions (e.g. 0.1 to 5 wt %, preferably approx. 2 wt %, referred to the weight of the moulding in each case) can be for example a finely-divided, highly silanized, granular or fibrous filler, in particular e.g. extremely fine cristobalite meal with average particle sizes in the range from approx. 0.5 to 10 $\mu$m, preferably approx. 3 $\mu$m. The degree of silanization comes to preferably 0.1 to 2, preferably approx. 0.9 wt % (referred to the filler weight).

The use of such additives enables the depth effect of the water whitening effect to be further suppressed compared with formulations which dispense completely with additives in the polymer phase.

The curable reaction mass is frequently formed by a first monomer/pre-polymer syrup, which preferably has a pre-polymer content of approx. 5 to approx. 30 wt %. Such syrups are known per se from casting technology.

The viscosity of the first syrup and hence also of the reaction mass is preferably chosen in the range from approx. 20 to approx. 300 mPas, since a simple distribution of the reaction mass amongst the filling material and hence a uniform swelling of the filling material can be achieved in this way.

Experience shows that pre-polymers in the first syrup with an average molecular weight in the range from approx. 20 000 to 300 000 Da are suitable.

The first syrup contains preferably a radically polymerisable monomer or various monomers of this type and a pre-polymer as homo- or copolymer of the monomer or monomers. Particularly preferred here are monomers of the, acrylate type.

Alternatively the first syrup can also be based on a polyester resin.

The first syrup will preferably contain a cross-linking agent in an amount of approx. 0.5 to approx. 5 wt % (referred to the moulding weight), wherein the cross-linking agent is preferably chosen from the series of the bi- and polyfunctinal acrylate crosslinking agents. Examples of these are the cross-linking agents TRIM (trimethylolpropanetrimethacrylate) and EDMA (ethyleneglycol dimethacrylate).

Further a single-stage or multi-stage peroxide initiator system is preferably added to the syrup.

In order to facilitate the withdrawal of the fully cured plastics moulding from the mould, a mould release agent is preferably added to the first syrup in an amount of approx. 0.03 to approx. 0.3 wt % (referred to the moulding weight). Stearic acid in particular is suitable as mould release agent.

The resin material of the filling material is preferably produced with the use of a second monomer/pre-polymer syrup, wherein the pre-polymer content preferably comes to approx. 5 to approx. 30 wt % of the syrup. The statements on the suitable monomers and pre-polymers in conjunction with the description of the first syrup apply here analogously.

A value for the viscosity of the second syrup in the range from approx. 20 to approx. 300 mPas has proved to be particularly suitable, not only because the same material can then optionally be used for the first and the second syrup, but also because a mixing of the syrup with the filler and a complete wetting of the filler particles can be achieved particularly easily in this viscosity range.

The inorganic filler is preferably used in granular or fibrous form. In addition to a uniform filler a mixture of different fillers can also be used.

Examples of the filler include silicate fillers such as cristobalite, quartz or wollastonite, and also aluminium oxide and ATH.

Particularly preferred is ATH, which is silanized with a silane in an amount of approx. 0.04 to approx. 1 wt % (referred to the weight of the ATH).

With the second syrup, as with the first syrup, there is recommended the use of crosslinking agents, wherein the same recommendations apply as with the first syrup. The swelling behaviour of the filling material can be varied and brought into the desired range through the choice and the amount of the crosslinking agent added.

As regards the curing of the second syrup for forming the filled resin material, use is preferably made of an initiator system which has already been discussed in connection with the first syrup.

Not only is a single filled resin material suitable as particulate filling material, but the filling material can also be formed by a mixture of different resin materials. Thus filled and unfilled resin materials, for example, can be used in a mixture. The various resin materials can also contain different polymers and/or different fillers, wherein silanized and unsilanized fillers can also be included in the latter. In addition, the various resin materials can also contain various pigments. The various resin materials can further exhibit different particle sizes. The swellability of the various resin materials can naturally also vary in extent. Critical, however, is that the filling material as a whole shows the required swelling behaviour.

These and further advantages of the invention are explained in greater detail below by means of the examples.

DESCRIPTION OF THE INVENTION

Production of the Filled Resin Material/Formulations

Figures 1, 1A:
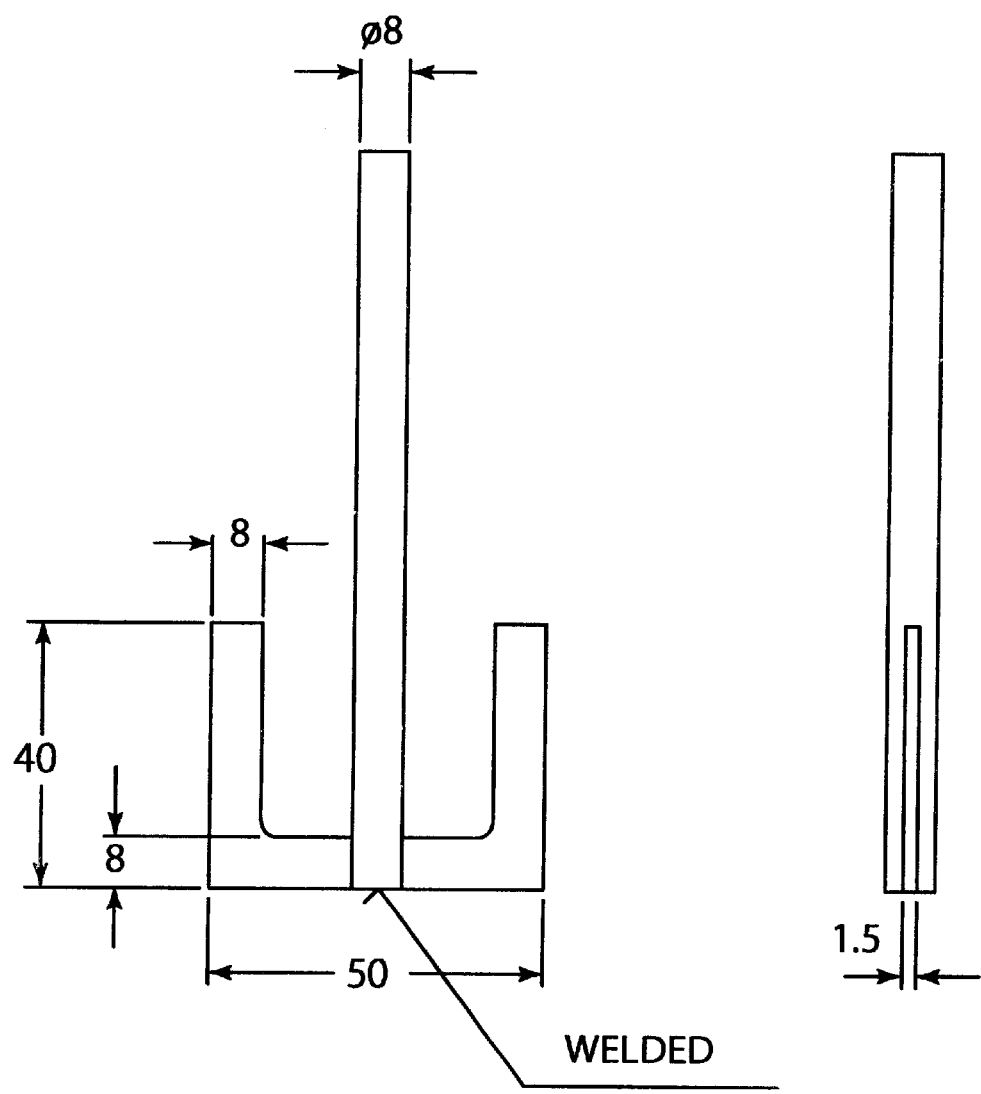
FIG. 1 is a view of an anchor agitator of the torque rheometer.
FIG. 1A is a side elevational view of the anchor agitator of FIG. 1.

The properties of the granule of filled resin material, in particular its swelling behaviour, are dependent on the nature of the filler used, the filler content, the nature of the polymer used and the degree of crosslinking in the polymer.

For the production of qualitatively high-grade moulded parts preferably two different polymer granules are used: a type produced with the use of an unsilanized ATH and a type produced with the use of a silanized ATH.

Filler 1 (not silanized)
Filler: cristobalite, quartz, $Al_2O_3$, ATH, preferably ATH
Amount used (ATH): 50–80 wt %, preferably 73 wt %
average particle sizes 20–60 μm, preferably approx. 35–40 μm
Filler 2 (silanized):
ATH with the specifications according to Filler 1, silanized with the use of 0.04–1 wt % silane, referred to the weight of the ATH, preferably 0.2 wt %. A preferred silane for the silanization is methacrylsilane.

For formulations 1 and 2 a radically polymerisable casting resin is used for forming the filled resin component, preferably an acrylate syrup (e.g. PMMA dissolved in MMA) and mixed with the filler 1 or the filler 2 in the amounts given there.

The amount of the acrylate syrup used complements the amount of filler given above to approx. 100 wt % and is therefore in the range of approx. 50 to approx. 20 wt %, preferably approx. 27 wt %.

Solids content in the syrup: pre-polymer of the monomer used in the form of a homo- or copolymer, preferably PMMA homopolymer, with an average molecular weight of approx. 20 000 to approx. 300 000 Da, preferably approx. 100000 Da. Quantitatively the solids/pre-polymer content comes to approx. 5 to approx. 30 wt %, referred to the weight of the syrup, preferably to approx. 15 wt %.

Preferably the syrup possesses a viscosity of approx. 20 to approx. 300 mPas, preferably of approx. 40 mPas.

In both formulations a crosslinking agent, such as TRIM, EDMA or similar, preferably TRIM, is used in an amount of approx. 0.5 to approx. 5 wt %, preferably of approx. 1 wt %, referred to the weight of the moulding in each case.

In both formulations a peroxide initiator system is used to initiate the curing and thermal initiation carried out.

Of the 1-, 2- or 3-stage systems offered, preferably the 2-stage one is used (wt % referred to the moulding weight):

| 1st stage: | 0.05–0.2% | preferably BCHPC: | 0.1 wt % |
| 2nd stage: | 0.1–0.4% | preferably LP: | 0.15 wt %; | and if a 3-stage system is to be used:

| 3rd stage: | 0.05–0.2% | preferably TBPB: | 0.1 wt %. |

Further preferred additives for the two formulations are:
Mould release agent, preferably stearic acid, in an amount of approx. 0.05 to approx. 0.3 wt %, referred to the weight of the moulding, preferably 0.1 wt %.

Pigments, depending on colour and/or contrast required.
Mixing and Casting:

The liquid components for the syrup are mixed: the filler added, mixed, the material degassed and cast into slabs. The curing is initiated thermally at a mould temperature of 80 to 120° C., preferably approx. 90° C.

Grinding:

After a coarse crushing, e.g. breaking with a roll breaker, of the slabs described above to a particle size of approx. 10 to 70 mm, the fine crushing to the definitively desired particle size takes place. The desired particle fractions are then divided up by screening, wherein extremely fine portions in the granule obtained in particular are eliminated, since they are undesirable.

Determination of the Swelling Behaviour of the Polymer Granule

The crucial criterion for the process according to the invention is the swelling behaviour of the filling material in the mixture with the reaction mass. This depends on receptive conditions and also on the particle size distribution and the surface properties of the individual granule particles. The various particle size distributions and mixtures of different colours are required in accordance with the design required.

To determine whether a granule can be processed by the displacement method, a test process must first be carried out in order to determine the swelling factor, which is calculated as the ratio of a final viscosity value to an initial viscosity value.

Test Process:
1. Test formulation: 60 wt % of reaction mass which is to be used to form the polymer phase;
   40 wt % of particulate filling material, e.g. the granule from formulations 1 and 2.
2. A torque-rheometer (e.g. Rheosyst 1000 Duo of the firm Coesfeld GmbH+Co KG, Dortmund) is employed to measure the viscosity. A u-shaped anchor agitator is used as agitator, the exact dimensions of which follow from FIG. 1 and FIG. 1A (diameter 50 mm; height of the blade 40 mm; width of the blade: 8 mm). The torque is measured by means of strain gauges. The test formulation is placed in a polyethylene beaker (diameter: top 60, bottom 54 mm; height 70 mm) and measured.
3. When the viscosity test value has stabilized after an initial phase (approx. 1 min), the initial viscosity value is determined at 40 rev/min. The system must be agitated initially (approx. 1 min) at a higher rotational speed (e.g. 100 rev/min), in order to prevent a sedimentation of the still not swollen granule. The speed of the agitator is reduced later to the test rotation value of 40 rev/min. After 4 min at 40 rev/min the initial viscosity value is measured. The control of the measuring instrument, as well as the recording of the data, is carried out by PC. The final viscosity value is measured 25 min after determination of the initial viscosity value and the swelling factor determined.

Carrying out of the Measurement, Illustrated by an Example:

102 g of acrylic syrup (PMMA in MMA, 15%) are placed in the polyethylene beaker. The torque rheometer is fitted with the anchor agitator shown in FIG. 1. The anchor agitator is adjusted to a gap of 3 mm above the beaker bottom. The system is thermostatted to 30° C. Thereafter 68 g of granule (pre-thermostatted) are added and the computer program started. Agitation is performed first of all for 1 min at 100 rev/min; the actual time-dependent measurement of the torque is carried out at 40 rev/min. The initial viscosity value is measured after agitation has been continued for a further 4 min at 40 rev/min. Since measurement is always carried out under exactly the same conditions, the torque is measured (in Ncm) and not the viscosity. The mixture starts to swell and the viscosity rises. After a further 25 min the final viscosity is measured and the swelling factor formed.

Because of the different formulations and hence mechanical properties, polymer granules with different particle size distributions are obtained after the grinding. It is important, however, that in each case a filling material granule is used which conforms to the required swelling behaviour.

Production of Slabs and Moulded Darts

Formulation/Properties of the Reaction Mass:

Mixtures of granules with varying swelling behaviour have proved to be optimal.

If a granule produced from a silanized ATH is exclusively used, the swellability of a granule mixture is too little in some cases, and the process according to the invention for producing plastics mouldings does not function optimally. The moulded parts can contain defects. Moreover, the exclusive use of silanized ATH is frequently problematical, since the basins can rupture in the hot-cold cycle after less than 1000 cycles.

With a still smaller swelling behaviour the granule particles become wedged together and the casting mould cannot be closed. At the same time the mixture is now virtually squeezed out and areas with different polymer contents are obtained.

The test criterion of water whitening important for the moulded parts is dependent on the granule colours used.

In the present process the set object of a good hot-cold resistance combined with very good water whitening is achieved in such a way that exclusively a polymer granule and no loose ATH is used. In, addition, preferably two different types of granules are used:
   a) a type of granule produced from coated ATH (see filler 2)
   b) a type of granule produced from uncoated ATH (see filler 1).

If, when 60 wt % of granule is used, at least 6 wt % of the granule amount of type b) with a particle size distribution of 100–600 μm is used, moulded parts with a hot-cold resistance of 3000 cycles and better are obtained. Due to the high content of granule of type a) a material with a very good, i.e. low water whitening is in addition obtained.

As a second requirement the content of easily swellable granule must be so adjusted that a moulding of the reaction mass by the displacement method according to the invention is possible.

It has further been found that a final torque of at least 1 Ncm is highly recommendable for effectively preventing a sedimentation.

Use is made for decorative slabs and moulded parts of polymer granules of different colours and particle size distributions.

Fine Designs: 3–7 different colours, particle size distribution: 60–900 μm, preferably 100–600 μm.

Medium Designs: 3–7 different colours, particle size distribution: 60–2700 μm, preferably 100–2500 μm.

Coarse Designs: 3–7 different colours, particle size distribution: 60–8000 μm, preferably 100–5000 μm.

The content of fine granular material (100–600 μm) also predominates in the medium-coarse and coarse designs and as a rule constitutes at least 4.0 wt % of the total amount of granular material.

Firstly all the liquid components are mixed. The granular polymer material is then added and the material degassed. The granular; polymer material added starts to swell and within a short time the mixture is present as an unpumpable casting compound which can then only be processed with a specially adapted technology. Critical for the operation of the displacement method is the swellability of the polymer granule, together with the final viscosity of the reaction mass. If a swellable polymer granule is present, the phase boundary is swollen/softened by diffusing-in monomer. The swollen particles are thereby enabled to slide against one another under pressure and according to the displacement method fill the three-dimensional shapes completely and without the formation of flow lines.

In contrast to this, non-swellable particles cannot be compressed to moulded parts by the displacement method. The as a rule sharp-edged particles are not able to slide against one another and are therefore wedged together. The material is consequently virtually squeezed out and the filler can first of all not spread out regularly or the material is not distributed regularly in the mould or in borderline cases the mould will not close.

Moulded Parts: Moulded parts are produced by a displacement method. The mould is located in a press. The press is opened and the material is placed as lumps in the lower or female mould. The upper or male mould moves downwards and displaces the material and thus forms the three-dimensional shape. The procedure requires special sealing systems. Female and male mould have in the area of the seal a gap of only a few tenths of a millimetre. Air-permeable felt is used as sealing material, so that the air can escape on all sides. Curing takes place by thermal initiation.

Slabs: The non-flowable material is placed in the mould by means of a twin belt, drawn into a press and polymerized under pressure and temperature.

EXAMPLES

Production of the Granular Polymer Material

Example 1

25.68 kg of acrylic syrup (solids content 15%, viscosity 40 mPa·s), 1 kg TRIM, 70 g stearic acid, 90 g BCHPC, 160 g LP are mixed with one another in an intensive mixer for approx. 2 min. 73 kg ATH ($d_{50}$=35 $\mu$m) are then added with the agitator running.

The pigments are added in the form of a colour paste, e.g. 2 kg of black paste.

The material is mixed and simultaneously degassed for a further 3 min.

After removal from the mixer the flowable material in compressed in a mould press to approx. 6 mm thick pancakes and polymerized at a temperature of 90° C. The pancake is removed after 35 min. After cooling the pancake is coarse ground in a roll breaker and fine ground in a cutting mill and finally separated into the desired particle fractions with a screen tower.

Example 2

A silanized ATH is used, which is coated with 0.2 wt % methacrylsilane.

For the rest see Example 1.

Example 3

25.68 kg of acrylic syrup (solids content 15%, viscosity 40 mPa·s), 3 kg TRIM, 70 g stearic acid, 90 g BCHPC, 160 g LP are mixed with one another in an intensive mixer for approx. 2 min. 73 kg ATH ($d_{50}$=35 $\mu$m) are then added with the agitator running.

The pigments are added in the form of a colour paste, e.g. 2 kg of black paste.

The material is mixed and simultaneously degassed for a further 3 min.

For the rest see Example 1.

Example 4

A silanized ATH is used, which is coated with 0.2 wt % methacrylsilane.

For the rest see Example 3.

Example 5

38.6 kg of acrylic syrup (solids content 15%, viscosity 40 mPa·s), 1.05 kg

TRIM, 100 g stearic acid, 100 g BCHPC, 150 g LP are mixed with one another in an intensive mixer for approx. 2 min. 60 kg ATH ($d_{50}$=35 $\mu$m) are then added with the agitator running.

The pigments are added in the form of a colour paste, e.g. 2 kg of black paste. The material is mixed and simultaneously degassed for a further 3 min.

For the rest see Example 1.

Example 6

19.07 kg of acrylic syrup (solids content 15%, viscosity 40 mPa·s), 7745 g

TRIM, 50 g stearic acid, 67 g BCHPC, 118 g LP are mixed with one another in an intensive mixer for approx. 2 min. 80 kg ATH ($d_{50}$=35 $\mu$m) are then added with the agitator running.

The pigments are added in the form of a colour paste, e.g. 2 kg of black paste. The material is mixed and simultaneously degassed for a further 5 min.

For the rest see Example 1.

TABLE 1

| Example | Initial torque | Torque after 25 min | Swelling factor | Final torque |
|---------|---------------|---------------------|-----------------|--------------|
| 7 | 0.7 | 2.9 | 4.2 | 3.8 |
| 8 | 0.45 | 1.24 | 2.7 | 1.3 |
| 9 | 0.63 | 1.53 | 2.4 | 1.2 |
| 10 | 0.42 | 1.35 | 3.3 | 1.3 |

Production of an acrylic moulded part:

Example 7

38.6 kg of acrylic syrup (solids content 15%, viscosity 40 mPa·s), 0.9 kg

TRIM, 100 g stearic acid, 150 g BCHPC, 250 g LP are mixed with one another in an intensive mixer for approx. 2 min. 60 kg of a black PLAIN mixture (see Example 1) with a particle size distribution of 100–600 $\mu$m are then added with the agitator running.

The material is mixed and simultaneously degassed for a further 3 min.

The emptying of the mixer takes place via a bottom flap. The whole mixture is allowed to swell for at least one hour. Approx. 3.5 kg are then removed from the container and introduced as lumps into an open mould. The mould has a temperature of 60° C. The mould is closed by means of a hydraulic system and the temperature program for the thermally initiated polymerization started. Demoulding takes place after 35 min.

The result is a black washbasin. Since a fine granule was used, the basin is plain-coloured. Granule structures cannot be distinguished.

Hot-cold cycle (3 min 87° C.; 3 min 21° C.): >3000 cycles without crack formation.

Water whitening: good to very good

Example 8

38.6 kg of acrylic syrup (solids content 5%, viscosity 40 mPa·s), 0.9 kg

TRIM, 100 g stearic acid, 150 g BCHPC, 250 g LP are mixed With one another in an intensive mixer for approx. 2 min. 40 kg of granule (unpigmented, Example 2), 16.25 kg (white, Example 1), 3.75 kg of granule (black Example, 2) with a particle size distribution of 100–600 $\mu$m are then added with the agitator running. The material is mixed and simultaneously degassed for a further 3 min.

Further procedure: see Example 7.

The result is a grey, granite-type washbasin.

Hot-cold cycle (3 min 87° C.; 3 min 21° C.):>3000, cycles without crack formation.

Water whitening: good

Example 9

38.6 kg of acrylic syrup (solids content 15%., viscosity 40 mPa·s), 0.9 kg

TRIM, 100 g stearic acid, 150 g BCHPC, 250 g LP are mixed with one another in an intensive mixer for approx. 2 min. 20 kg of granule (unpigmented, Example 2), 7.00 kg (white, Example 1), 32 kg of granule (black, Example 2) with a particle size distribution of 100–600 μm as well as 1 kg of granule (white, Example 1) with a particle size distribution of 0.6–1.2 are then added with the agitator running. The material is mixed and simultaneously degassed for a further 3 min.

Further procedure: see Example 7.

The result is an almost black, granite-type washbasin.

Hot-cold cycle (3 min 87° C.; 3 min 21° C.): >3000 cycles without crack formation.

Water whitening: very good

Example 10

38.6 kg of acrylic syrup (solids content 15%, viscosity 40 mPa·s), 0.9 kg

TRIM, 100 g stearic acid, 150 g BCHPC, 250 g LP are mixed with one another in an intensive mixer for approx. 2 min. The granule is then added with the agitator running, namely as follows:

40 kg granule (unpigmented, Example 2, 0.1 to 0.6 mm)

7 kg granule (unpigmented, Example 2, 2.5 to 5 mm)

5 kg granule (white, Example 1, 0.1 to 0.6 mm)

1 kg granule (white, Example 1, 0.6 to 1.2 mm)

2 kg granule (white, Example 1, 1.2 to 2.5 mm)

1 kg granule (black, Example 2, 0.1 to 0.6 mm)

1 kg granule (black, Example 2, 0.6 to 1.2 mm)

2 kg granule (black, Example 2, 1.2 to 2.5 mm)

1 kg granule (blue, Example 1, 0.1 to 0.6 mm)

The material is mixed and simultaneously degassed for a further 5 min.

Further procedure: see Example 7.

The result is a grey, coarse-structured, granite-type washbasin.

Hot-cold cycle (3 min 87° C.; 3 min 21° C.):>3000 cycles without crack formation.

Water whitening: good

Example 11

36.73 kg of acrylic syrup (solids content 15%, viscosity 40 mPa·s), 0.8 kg

TRIM, 105 g stearic acid, 135 g BCHPC, 230 g LP are mixed with one another in an intensive mixer for approx. 2 min. 2 kg of extremely fine cristobalite meal (d50=3 μm, silane content 0.9 wt %), 40 kg of granule (unpigmented, Example 2), 16.25 kg of granule (white, Example 1), 3.75 kg of granule (black, Example 2) with a particle size distribution of 100 to 600 μm are then added with the agitator running. The material is mixed and simultaneously degassed for a further 5 min.

The rest of the procedure corresponds to Example 7.

The result is a grey, granite-type washbasin.

Hot-cold cycle (3 min 87° C.; 3 min 21° C.): >3000 cycles without crack formation.

Water whitening: very good

Example 11 demonstrates in comparison with Examples 7 to 10 the effect of the addition of the additive extremely fine cristobalite meal to the reaction mass in order to form the polymer phase:

For an evaluation of the washbasins after respectively 1000 hot-cold cycles, the moulded part is sawn into two parts in the area of the outlet, where the strongest water whitening occurs, and the saw cut surface is fine ground.

It is then evaluated visually how far the material brightening has penetrated into the depths of the material due to water whitening.

The following depths were obtained as a result:

Example 7: 1.5 mm

Examples 8–10: approx. 0.5 mm

Example 11: 0.2 mm

This means that the water whitening effect can with the moulded part according to Example 11 be removed again by grinding. With the other moulded parts according to Examples 7 to 10 the depth effect of the water whitening effect is too great for this.

What is claimed is:

1. Plastics moulding, comprising a polymer phase formed from a curable reaction mass and a particulate filling material embedded therein, wherein the filling material contains a resin material filled with an inorganic filler, wherein the polymer phase contains up to 5 wt %, based on the plastics moulding, of inorganic additive particles, wherein the particulate filling material is swollen in the curable reaction mass until the mixture thereof is no longer pourable, wherein the filled resin material comprises a content of inorganic filler in the range from 50 to 80 wt % of said filled resin material with an average particle size of approximately 5 to approximately 100 μm, and wherein the filling material has a particle size in the range from 60 to 8000 μm and is contained in the plastics moulding in a proportion of approximately 30 to approximately 75 wt %.

2. Plastics moulding according to claim 1 characterised in that the particulate filling material is swellable in the curable reaction mass in such a way that a test formulation of 60 wt % of curable reaction mass and 40 wt % of the particulate filling material has a swell factor >2.

3. Plastics moulding according to claim 2, characterised in that the curable reaction mass contains a first syrup comprising a monomer and a pre-polymer.

4. Plastics moulding according to claim 3, characterised in that the pre-polymer content of the first syrup comprises approximately 5 to approximately 30 wt % of said first syrup.

5. Plastics moulding according to claim 3, characterised in that the viscosity of the first syrup is approximately 20 to approximately 300 mPas at 30 degrees C.

6. Plastics moulding according to claim 3, characterised in that the first syrup contains a radically polymerisable monomer and a pre-polymer as a homo- or copolymer of the monomer.

7. Plastics moulding according to claim 3, characterised in that the pre-polymer of said first syrup comprises a polyester resin.

8. Plastics moulding according to claim 3, characterised in that the first syrup contains a crosslinking agent in an amount of approximately 0.5 to approximately 5 wt % (based on the plastics moulding weight).

9. Plastics moulding according to claim 3, characterised in that the first syrup contains a peroxide initiator system.

10. Plastics moulding according to claim 3, characterised in that the first syrup contains a mould release agent in an amount of 0.05 to 0.3 wt %, based on the total weight of the plastics moulding.

11. Plastics moulding according to claim 2, characterised in that the resin material of the filling material is produced from a second syrup comprising a monomer and a pre-polymer and containing a proportion of approximately 5 to approximately 30 wt % pre-polymer.

12. Plastics moulding according to claim 11, characterised in that the viscosity of the second syrup is approximately 20 to approximately 300 mPas at 30 degrees C.

13. Plastics moulding according to claim 2, characterised in that the inorganic filler is selected from the group consisting of a granular filler and a fibrous filler.

14. Plastics moulding according to claim 13, characterised in that the filler is selected from the group consisting of a silicate filler, aluminum oxide and aluminum oxide trihydrate.

15. Plastics moulding according to claim 14, characterized in that the aluminum oxide trihydrate comprises coated aluminum oxide trihydrate which is coated with a silane in an amount of 0.04 to 1 wt %, based on the weight of the aluminum oxide trihydrate.

16. Plastics moulding according to claim 11, characterised in that the second syrup contains a crosslinking agent with a content of approximately 0.5 to approximately 5 wt %, based on the total weight of the plastics moulding.

17. Plastics moulding according to claim 11, characterised in that the second syrup contains a radically polymerisable monomer and a pre-polymer selected from the group consisting of a homo-polymer and a copolymer of the monomer.

18. Plastics moulding according to any one of claim 11, characterised in that the second syrup contains a polyester resin.

19. Plastics moulding according to claim 17, characterised in that the second syrup contains a crosslinking agent selected from the group consisting of a bifunctional acrylate crosslinking agent and a polyfunctional acrylate crosslinking agent.

20. Plastics moulding according to claim 11, characterised in that the second syrup contains an initiator system.

21. Plastics moulding according to claim 11, characterised in that the second syrup contains a mould release agent in an amount of 0.05 to 0.3 wt % (based on the weight of the plastics moulding).

22. Plastics moulding according to claim 2, characterized in the particulate filling material is a mixture of granular filling materials.

23. Plastics moulding according to claim 2, characterised in that the filling material has a final torque of >1 Ncm.

24. Plastics moulding according to claim 8, wherein said crosslinking agent is selected from the group consisting of a bi-functional acrylate crosslinking agent and a polyfunctional acrylate crosslinking agent.

25. Plastics moulding according to claim 10 wherein said release agent comprises stearic acid.

26. Plastics moulding according to claim 14, wherein said silicate filler is selected from the group consisting of cristobalite, quartz, and wollastonite.

27. Plastics moulding according to claim 17, wherein said monomer comprises an acrylate.

28. Plastics moulding according to claim 21, wherein said release agent comprises stearic acid.

29. Process for producing a plastics moulding, comprising:

provided a mixture of a curable reaction mass for forming a polymer phase and a swellable particulate filling material present in said curable reaction mass in an amount of about 30 to about 75 weight % of said plastics moulding, said particulate filling material comprising particles having a resin material filled with an inorganic filler and having a particle size of about 60 to about 8000 $\mu$m, said inorganic filler having an average filler particle size of about 5 to about 100 $\mu$m and being present in an amount of about 50 to about 80 weight % of said particulate filling material, said curable reaction mass being substantially free of inorganic filler except for said inorganic filler in said particulate filling material, allowing said particulate filling material to swell in said curable reaction mass until such time as said mixture is no longer pourable, placing said mixture for curing in a mould disposed in a press, closing said mould, applying a predetermined compressive force to said mould using said press, and thermally curing said mixture in the closed mould under said compressive force.

* * * * *

UNITED STATES PATENT AND TRADEMARK OFFICE
CERTIFICATE OF CORRECTION

PATENT NO.    : 6,525,122 B1
DATED         : February 25, 2003
INVENTOR(S)   : Friedrich Schock et al.

It is certified that error appears in the above-identified patent and that said Letters Patent is hereby corrected as shown below:

Column 13,
Line 24, delete "any one of".

Signed and Sealed this

Nineteenth Day of August, 2003

JAMES E. ROGAN
*Director of the United States Patent and Trademark Office*